United States Patent [19]

Donohue

[11] 4,107,163
[45] Aug. 15, 1978

[54] PEROVSKITE-TYPE COMPOSITIONS CONTAINING PENTAVALENT RU

[75] Inventor: Paul Christopher Donohue, Wilmington, Del.

[73] Assignee: E. I. Du Pont de Nemours and Company, Wilmington, Del.

[21] Appl. No.: 675,768

[22] Filed: Apr. 12, 1976

[51] Int. Cl.² ............ C01F 17/00; C01G 55/00; C01F 11/00
[52] U.S. Cl. ............ 423/263; 252/62.3 R; 252/62.3 T; 252/462; 252/473; 423/593; 423/213.5; 252/521
[58] Field of Search ......... 423/263, 593; 252/462, 252/473

[56] References Cited

U.S. PATENT DOCUMENTS

| 3,553,109 | 1/1971 | Hoffman | 423/593 |
| 3,583,931 | 6/1971 | Bonehard | 423/593 |
| 3,901,828 | 8/1975 | Mai et al. | 252/262 |
| 3,907,968 | 9/1975 | Kobylinski et al. | 423/593 |
| 3,972,837 | 8/1976 | Acres et al. | 423/593 |
| 4,001,143 | 1/1977 | McCann | 252/262 |

OTHER PUBLICATIONS

Bailar et al., Eds., "Comprehensive Inorganic Chemistry", Pergamon Press, 1973, p. 4, vol. 4.
Cotton et al., "Advanced Inorganic Chemistry", 3 ed., Interscience Publishers, N.Y., p. 1066.
Donohue et al., "Inorganic Chemistry", vol. 5, 1966, pp. 336-338.
Blasse, "J. Inorganic Nuclear Chem.", vol. 27, 1965, pp. 993-1003.

*Primary Examiner*—Herbert T. Carter

[57] ABSTRACT

Metal oxides of the formula $$Q_2MRuO_6$$

wherein Q is barium or strontium, and M is yttrium, bismuth or a rare earth metal of atomic number 57 to 70, in which ruthenium has a valence of 5, and which have a perovskite-type crystal structure are highly useful as emission catalysts for $NO_x$ reduction and oxidation of CO.

5 Claims, No Drawings

PEROVSKITE-TYPE COMPOSITIONS CONTAINING PENTAVALENT RU

BACKGROUND OF THE INVENTION

1. Field of the Invention

This invention relates to metal oxides containing pentavalent ruthenium and having a perovskite-type crystal structure, and to their use as emission control catalysts.

2. Description of the Prior Art

It is known that Ru and Ru-containing compounds are good reduction catalysts, and thus their use to reduce $NO_x$ to $N_2$ in exhaust gases from internal combustion engines has been proposed. However, Ru is normally volatile at the high temperatures encountered in these exhaust gases.

In *Platinum Metals Review*, vol. 18, no. 1, p. 2 (1974), Shelef et al. teach stabilizing Ru against loss by volatilization by incorporating Ru oxide in a compound with basic oxides such as $BaRuO_3$.

In a dissertation submitted to the University of Connecticut in 1965, P. C. Donohue disclosed hexagonal close packed structures of alkaline earth ruthenium oxides of the formula $Ba(RuM)O_3$ in which M is various metals, some of said compounds having perovskite-type crystal structures and certain others having ruthenium in the pentavalent state. This subject is further disclosed by Donohue et al. in *Inorganic Chemistry*, vol. 5, no. 3, pp. 339–342 (1966). In this article compounds in which M is Zr, Mn, Ni, and Mg are described.

SUMMARY OF THE INVENTION

In accordance with this invention we have discovered metal oxides containing pentavalent ruthenium which exhibit perovskite-type crystal structures and are of the formula $$Q_2MRuO_6$$ 

wherein Q is barium or strontium, and M is yttrium, bismuth or a rare earth metal of atomic number 57 to 70, provided that when Q is strontium, M is not bismuth. These metal oxides are useful as emission control catalysts for internal combustion engines. Specific metal oxides which exhibit these properties are of the formulae $$Ba_2M'RuO_6$$ 

and $$Sr_2M''RuO_6$$ 

in which M' is yttrium, bismuth or a rare earth metal of atomic number 57 to 70 and M" is yttrium or a rare earth metal of atomic number 57 to 70.

DETAILED DESCRIPTION OF THE INVENTION

The metal oxides of this invention are pentavalent ruthenium compounds which have two basic characteristics, namely, they (1) have a perovskite-type crystal structure and (2) are of the formula $$Q_2MRuO_6.$$ 

Specific metal oxides which are suitable include $Ba_2LaRuO_6$, $Ba_2GdRuO_6$, $Ba_2EuRuO_6$, $Ba_2DyRuO_6$, $Ba_2CeRuO_6$, $Ba_2RuTbO_6$, $Ba_2BiRuO_6$, $Ba_2YRuO_6$, $Sr_2LaRuO_6$, $Sr_2NdRuO_6$, $Sr_2GdRuO_6$, $Sr_2HoRuO_6$, $Sr_2LaRuO_6$, $Sr_2YbRuO_6$ and $Sr_2YRuO_6$. The most preferred pentavalent ruthenate composition is $Ba_2LaRuO_6$.

It is known in the art that Ru-containing compounds are good reduction catalysts, especially for the reaction of $NO_x$ to $N_2$. Compositions, however, containing lower valent ruthenates have a tendency to form $Ru°$ on reduction leading to Ru-loss via $RuO_4$ volatilization if intermittent oxidizing exposure occurs, thereby drastically reducing the effectiveness of the catalyst. The advantage of the compound of this invention is their greater thermal stability.

The catalytic stability of the compositions of the present invention is reinforced against Ru loss by volatilization under oxidation-reduction conditions by (1) stabilizing the ruthenate compositions with three basic ions (2 alkaline earth metal + rare earth metal) per Ru in contrast to, e.g. $BaRuO_3$ where it is stabilized by only one basic ion, and (2) utilizing ruthenium in its inherently more stable pentavlent state.

The compositions characterizing the present invention, because of their perovskite-type crystal structures and the pentavalent state of the combined ruthenium which is stabilized in the presence of three basic cations, exhibit high stability toward reduction, making them highly useful as emission catalysts for $NO_x$ reduction where $x = 1$ or 2 and oxidation of CO.

By "perovskite-type crystal structures" is meant crystal structures similar to those of perovskite ($CaTiO_3$). Ideal perovskite structures ($ABO_3$) contain cations of appropriate relative sizes and coordination properties and have cubic crystalline forms in which the corners of the unit cubes are occupied by the larger type A cations (each coordinated with twelve oxide ions), the centers of the cubes are occupied by the smaller type B cations (each coordinated with six oxide ions), and the faces of the cubes are occupied by oxide ions. Variations and distortions of this fundamental cubic crystal structure are known among materials commonly considered to be perovskites or perovskite-like. Distortions of the cubic crystal structure of perovskite and perovskite-like metal oxides include rhombohedral, orthorhombic, pseudocubic, tetragonal, and pseudotetragonal modifications. In all these crystal structures, it is required that the total number of A site cations should substantially equal the total number of B site cations, also that the combined charge of the cations substantially equals the charge on the oxygen atoms.

The formation of these structures is a function of the ionic radii and electronegativity of the ions. Goldschmidt [*Geochemische Verteilungsgesotze der Elementa VII, VIII*, (1927,28)] defined the tolerable limits for perovskite formation, $t - (r_a + r_x)/\sqrt{2}(r_b + r_x)$ where, in $ABX_3$, $r$ stands for the radii. The perovskite-type structure occurs when $t$ is in the ragne of 0.75–1.00. When $t$ is greater than 1.00, distortion to a hexagonal cell structure may occur. Cubic perovskite require $0.9 < t > 1.0$. Between $0.75 < t > 0.9$ a buckling of the lattice occurs causing distortion. All of the metal oxides of this invention are of a perovskite-type structure.

Complete ranges of solid solutions are possible for all the compositions falling within the scope of the present invention with the exception of the border-line cases such as $Ba_2YRuO_6$, $Ba_2CeRuO_6$, $Ba_2TbRuO_6$ and $Ba_2DyRuO_6$ where partial solid solutions may be expected.

Additionally, partial solid solutions with other transition metal perovskite-type structures may be expected e.g. with $LaCoO_3$. This leads to greater enhancement of catalytic activity.

Since the perovskite structure is known to exhibit both cation and anion nonstoichiometry as discussed by J. B. Goodenough and J. J. Longo, *Landolt-Börnstein*, Vol. 4a, 126–314 (1970), the compositions of the present invention may also exhibit nonstoichiometry, e.g., in a reducing atmosphere some oxygen may be lost, giving rise to such compositions as $Ba_2LaRuO_{6-x}$ where $x$ is 0 to about 0.1.

The high oxygen analysis of several of the compositions to be described in the examples to follow is thought to be due to adsorbed $CO_2$. The perovskite-type structure cannot easily accommodate excess oxygen (e.g. $Ba_2GdRuO_{6+x}$) since there are no lattice sites available. The direct valence analysis described in Example 1 is considered more reliable than the oxygen analysis and shows the Ru valence is primarily +5 with possibly some +4 present.

The compositions of the present invention may be prepared by several methods. The most convenient method for study of the isolated compositions is to grind and calcine in stoichiometric proportions the carbonates, nitrates, hydroxide or oxides of the alkaline earth and rare earth ions and Ru powder, nitrate, halide, or oxide. They may also be prepared on supports by impregnation with soluble salts of the constituents; e.g. their nitrates, followed by drying and calcination. The method of successive impregnation described by M. Shelaf and H. S. Gandi [*Platinum Metals Review*, 18(1), 2 (1974)] may be used. In this method a support is first impregnated with barium nitrate solution and calcined to convert to the oxide. It is then impregnated with $RuCl_3$, dried, reduced, and "fixed" by heating in air at 900° C.

As shown in Examples 3 and 6 the ruthenate compositions of the present invention show excellent advantage as catalysts for hydrocarbon reduction and especially NO reduction and CO oxidation making them excellent candidates as emission control catalysts for such applications as automotive exhaust gas purification and slack gas $NO_x$ abatement.

The compositions of this invention may also be used as semiconductors. For example, $Ba_2EuRuO_6$ powder exhibits resistivity at 298k ($P_{298k}$) = $2 \times 10^3$ ohm cm and Ea = 0.1 eV, and $Ba_2BiRuO_6$ exhibits $P_{298k} = 2 \times 10^2$ ohm cm and Ea = 0.15 eV. These compositions may be used in the many applications of semiconductors, e.g. resistors, thermoelectrics, etc.

The following examples illustrate the pentavalent ruthenium metal oxides of this invention, their preparation, and their use as emission control catalysts. All temperatures are in degrees Centigrade.

EXAMPLE I

Preparation of $Ba_2GdRuO_6$

A well ground mixture of 1.973 g $BaCO_3$ (0.01 moles), 0.906 g $Gd_2O_3$ (0.005 moles), and 0.665 g $RuO_2$ (.005 moles) was heated in air at 1100° C. for 1 hour, reground, and reheated at 1000° C. for 24 hours, reground, and reheated at 1000° C. for 48 hours. The X-ray powder pattern showed a cubic cell $a = 4.204 \pm 0.001$ Å and a few weak lines of extraneous phases amounting to about less than 5%. The powder pattern is shown in Table 1. It may be used to identify the cubic perovskite compounds of this invention.

Oxygen analysis established the formula. Found: 15.37% O. Calculated for $Ba_2GdRuO_6$: 15.26% O.

To establish the valence of Ru as +5, analysis was carried out of the $Cl_2$ generated by the reaction of $Ru^{+5}$ with HCl following the procedure described by J. D. Struthers and R. Ward in J. Am. Chem. Soc., 59, 1849 (1937). In HCl, $Ba_2GdRuO_6$ dissolves and $Cl_2$ is liberated, $\frac{1}{2}$ $Cl_2$ per $Ru^{+5}$ or: $Ru^{+5} + Cl^- \rightarrow Ru^{+4} + \frac{1}{2} Cl_2$.

| Results | | |
|---|---|---|
| Cl Calculated | Cl Found | Formula Calculated |
| 0.008914 | 0.007517 | $Ba_2GdRuO_{5.92}$ |
| 0.009187 | 0.007855 | $Ba_2GdRuO_{5.93}$ |
| 0.005822 | 0.005142 | $Ba_2GdRuO_{5.94}$ |

Since errors in this method tend to give low results (for example, by incomplete removal of $Cl_2$), coupled with the oxygen analysis the formula may safely be assigned as $Ba_2GdRuO_6$.

The valence of Ru is +5 or slightly lower. In the formula $Ba_2GdRuO_{5.93}$, the valence distribution is $Ba_2GdRu_{0.85}Ru_{0.15}O_{5.93}$. The valence of Ru may be slightly less than +5 (in this compound it is +4.85) due to O nonstoichiometry.

Since Gd lies in the middle of the rare earth series, the finding with regard to Ru valence of $Ba_2GdRuO_6$ should pertain throughout the series.

EXAMPLE 2

Preparation of $Sr_2GdRuO_6$

A well ground mixture of 1.4763 g $SrCO_3$ (0.01 moles), 0.906 g $Gd_2O_3$ (0.005 moles), 0.665 g $RuO_2$ (0.005 moles) was treated similar to Example 2. The product showed a single phase powder pattern indexable on the basis of an orthorhombically distorted perovskite-type cell. The cell dimensions are $a = 5.798 \pm 0.001$ Å, $b = 5.820 \pm 0.001$ Å, C = $8.224 \pm 0.003$ Å, and the powder pattern is shown in Table 2.

Oxygen analysis of the material is consistent with the formula $Sr_2GdRuO_6$. Found: 17.98% O. Calculated: 18.12%. Cl analysis as described in Example 1 shows that Ru valence is close to +5, perhaps slightly below.

| Cl Calculated | Cl Found | Formula | Ru valence |
|---|---|---|---|
| 0.00867 | 0.0073 | $Sr_2GdRuO_{5.93}$ | +4.85 |
| 0.010565 | 0.009837 | $Sr_2GdRuO_{5.967}$ | +4.93 |
| 0.01022 | 0.00932 | $Sr_2GdRuO_{5.95}$ | 4.90 |

The formula is very close to $Sr_2GdRuO_6$. There is always this possibility of some O nonstoichiometry.

Table 1

| X-Ray Powder Pattern of $Ba_2GdRuO_6$ | | | | | |
|---|---|---|---|---|---|
| Intensity | h | k | l | $d_{obs}$ | $d_{calc}$ |
| 100 | 1 | 1 | 0 | 2.9760 | 2.9727 |
| 2 | 1 | 1 | 1 | 2.4262 | 2.4272 |
| 26 | 2 | 0 | 0 | 2.1026 | 2.1020 |
| 33 | 2 | 1 | 1 | 1.7157 | 1.7163 |

Table 2

X-Ray Powder Pattern of $Sr_2GdRuO_6$

| Intensity | h | k | l | $d_{obs}$ | $d_{calc}$ |
|---|---|---|---|---|---|
| 5 | 0 | 1 | 1 | 4.7573 | 4.7511) |
|  | 1 | 0 | 1 |  | 4.7389) |
| 35 | 1 | 1 | 0 | 4.1090 | 4.1078) |
|  | 0 | 0 | 2 |  | 4.1122) |
| 5 | 1 | 1 | 1 | 3.6783 | 3.6749 |
| 100 | 1 | 1 | 2 | 2.9067 | 2.9062) |
|  | 0 | 2 | 0 |  | 2.9102) |
|  | 2 | 0 | 0 |  | 2.8991) |
| 5 | 0 | 2 | 1 | 2.7436 | 2.7435) |
|  | 0 | 0 | 3 |  | 2.7415) |
|  | 2 | 0 | 1 |  | 2.7342) |
| 10 | 1 | 0 | 3 | 2.4791 | 2.4784) |
|  | 1 | 2 | 1 |  | 2.4799) |
|  | 0 | 1 | 3 |  | 2.4801) |
|  | 2 | 1 | 1 |  | 2.4747) |
| 5 | 0 | 2 | 2 | 2.3762 | 2.3755) |
|  | 2 | 0 | 2 |  | 2.3694) |
| 5 | 1 | 1 | 3 | 2.2775 | 2.2803 |
| 75 | 2 | 2 | 0 | 2.0543 | 2.0539) |
|  | 0 | 0 | 4 |  | 2.0561) |
| 5 | 2 | 2 | 1 | 1.9935 | 1.9927) |
|  | 2 | 0 | 3 |  | 1.9919) |
|  | 0 | 2 | 3 |  | 1.9955) |
| 5 | 2 | 1 | 3 | 1.8842 | 1.8846) |
|  | 1 | 2 | 3 |  | 1.8869) |
|  | 3 | 0 | 1 |  | 1.8815) |
|  | 0 | 3 | 1 |  | 1.8883) |
| 10 | 1 | 3 | 0 | 1.8405 | 1.8399) |
|  | 1 | 1 | 4 |  | 1.8386) |
|  | 2 | 2 | 2 |  | 1.8374) |
| 10 | 3 | 1 | 0 | 1.8340 | 1.8342 |
| 10 | 1 | 3 | 1 | 1.7964 | 1.7955) |
|  | 3 | 1 | 1 |  | 1.7903) |
| 80 | 2 | 0 | 4 | 1.6778 | 1.6771) |
|  | 0 | 2 | 4 |  | 1.6793) |
|  | 1 | 3 | 2 |  | 1.6794) |
| 55 | 3 | 1 | 2 | 1.6730 | 1.6751 |
| 5 | 1 | 3 | 3 | 1.5278 | 1.5277) |
|  | 1 | 1 | 5 |  | 1.5270) |
|  | 3 | 1 | 3 |  | 1.5245) |
| 35 | 0 | 4 | 0 | 1.4547 | 1.4551) |
|  | 2 | 2 | 4 |  | 1.4531) |
| 35 | 4 | 0 | 0 | 1.4504 | 1.4495 |
| 5 | 0 | 0 | 6 | 1.3705 | 1.3707) |
|  | 1 | 3 | 4 |  | 1.3711) |
|  | 0 | 4 | 2 |  | 1.3717) |
|  | 3 | 3 | 0 |  | 1.3692) |
|  | 3 | 1 | 4 |  | 1.3687) |
|  | 4 | 0 | 2 |  | 1.3671) |
| 45 | 3 | 3 | 2 | 1.2989 | 1.2991) |
|  | 4 | 2 | 0 |  | 1.2975) |
|  | 1 | 1 | 6 |  | 1.3002) |
|  | 2 | 4 | 0 |  | 1.3005) |
| 5 | 3 | 3 | 3 | 1.2253 | 1.2249) |
|  | 3 | 1 | 5 |  | 1.2246) |

EXAMPLE 3

(A) Preparation of $Ba_2LaRuO_6$

A well ground mixture of 8.4296 g of $BaO_2$ (2 mole parts, 4.0548 g of $La_2O_3$ (½ mole part) and 2.5156 g of Ru (1 gram atom part) was heated in air at 900° C, followed by regrinding and reheating at 1100° for 20 hours. The X-ray powder diffraction pattern of the product showed a cubic perovskite-type cell in which $a = 4.26$ Å.

The powder prepared above was slurry coated onto 1 × 1 × 1/16 inch Tortex ® ceramic honeycomb cylinders to give a 17.2% coating by weight. These cylinders were used to test the powder as an emission control catalyst.

(B) Catalytic Activity in the Recution of Nitric Oxide by Carbon Monoxide

A coated Torvex ® cylinder was installed in a stainless steel chamber with a nominal internal diameter of 2.5 cm, height of 2.5 cm, and volume of 12.3 cc. Nitrogen containing about 2000 parts per million of nitric oxide and about 10,000 parts per million of carbon monoxide was passed through the chamber at a nominal hourly space velocity of about 40,000 hr.$^{-1}$ and pressure of 1 psig while the feed gas and the catalyst chamber were heated in a programmed manner so that the temperature of the gas entering the catalyst chamber increased from about 60° to about 600° over about 90 minutes. Samples of the inlet and exit gases were obtained periodically. The nitric oxide in these samples was oxidized to nitrogen dioxide and the resulting gas mixture was analyzed by a modification of the colorimetric procedure described by B. E. Saltzman in *Analytical Chemistry*, Volume 26, pages 1949–1955 (1954). The percent reduction in the nitric oxide concentration of the gas upon passing through the catalyst chamber was found to be nil at a catalyst chamber inlet temperature of 100°, 14.3% at 200°, 97.1% at 400°, 98.6% at 500°, and 98.6% at 600°. The catalyst temperature was about 660° with the gas entering the catalyst chamber at 600°. From a smooth curve through a plot of these results it was estimated that the conversion of nitric oxide was 25% at about 315°, 50% at about 340°, and 90% at about 390°, and that the "light-off" temperature (the intercept with the temperature axis of an extrapolation of the portion of the curve in which the degree of conversion changed rapidly with temperature) was about 280°. The "light-off" temperature and the temperatures of 25, 50, and 90% conversion after heating the catalyst-coated honeycomb cylinder at about 900° for 100 hours were also recorded.

(C) Catalytic Activity in the Oxidation of Carbon Monoxide

The catalytic activity of a coated Torvex ® cylinder in the oxidation of carbon monoxide was determined in an apparatus and by a procedure similar to that described in part (B) above. Nitrogen containing about 10,000 parts per million of carbon monoxide and 10,000 parts per million of oxygen was passed through the catalyst chamber and the entering and existing gas mixtures were analyzed chromatographically using a column containing granules of "Linde" 13X molecular sieve. The conversion of carbon monoxide was found to be 6.6% with a catalyst chamber inlet temperature of 140° C, 7.1% at 200°, 5.4% at 245°, and 100% at 275° and at 305°. The temperature of the catalyst was 330° with a catalyst chamber inlet temperture of 275°. From a smooth curve through a plot of these results it was estimated that the conversion of carbon monoxide was 25% at about 250°, 50% at about 260°, and 90% at about 270° and that the "light-off" temperature was about 245°. The "light-off" temperatures and the temperatures of 25, 50, and 90% conversion after heating the catalyst-coated honeycomb cylinder at about 900° for 100 hours were also recorded.

The results of the activity tests are as follows:

| Test | Light-off T | T for conversion of | | |
|---|---|---|---|---|
|  |  | 25% | 50% | 90% |
| NO + CO | 200/200* | 230/225* | 255/255* | 300/295* |
| CO + ½ $O_2$ | 205/200* | 225/235* | 250/250* | 325/275* |

*after 100 hr at 900°.

The results are excellent for NO reduction and in a good range for CO oxidation. The high activity after heating shows the superior stability of the catalyst.

The stability was further illustrated in thermal gravimetric analysis (TGA) experiments in a simulated emission mixture. In 1% $H_2$, 4% CO, 95% $N_2$ at 30 ml/min no weight loss was observed to 900° by TGA. The X-ray powder pattern also showed no change.

TGA in $O_2$ at 40 ml/min also showed no weight change to 950°.

EXAMPLE 4

Preparation of $Ba_2EuRuO_6$

A well ground mixture of 2.9379 g of $BaCO_3$ (2 mole parts), 1.3098 g of $Eu_2O_3$ (½ mole part), and 0.7523 g of Ru (1 gram atom part) was heated in air at 1000°, reground and heated at 1000° for 24 hr. The product showed a cubic perovskite-type cell $a = 4.21$ Å; calculated cell, $a = 4.212$ Å. Oxygen analysis showed that the Ru had a valence of 5. Found: 15.53% O, calc'd for $Ba_2EuRuO_6$: 15.39%.

This material was shown to be useful as a reduction catalyst. Thus, 1.5 ml of toluene and 1.0 g of $NH_3$ were heated in a 10-cc shaker tube at 450° for 10 min in the presence of about 30.5 g of $Ba_2EuRuO_6$. The product contained 11% methyl cyclohexane.

EXAMPLE 5

Preparation of $Ba_2DyRuO_6$

A well ground mixture of 2.8925 g of $BaCO_3$ (2 mole parts), 1.3668 g of $Dy_2O_3$ (½ mole part), and 0.7407 of Ru (1 gram atom part) was heated as in Example 4. The product showed a poorly formed perovskite pattern and some weak extraneous peaks present. It was reground and heated at 1100° for 24 hr. The product was single phase and showed a predominantly cubic perovskite-type cell, $a = 4.18$ Å; calc'd: 4.18 Å. Some weak extraneous peaks were still present.

EXAMPLE 6

Preparation of $Ba_2CeRuO_6$

A well ground mixture of 2.6135 of $BaO_2$ (2 mole parts), 0.7800 g of Ru (1 gram atom part) and 1.6063 g of $Ce(OH)_4$ (1 mole part) was heated at 1000° for 1 hr, reground, and heated at 1150° for 4 hr. The X-ray powder pattern was not single phase, so the product was reground and heated at 1150° for 48 hr, reground, and reheated at 1250° for 24 hr. The product was single phase and the X-ray powder pattern showed a distorted perovskite-type cell and weaker peaks of extraneous phases. Oxygen analysis: Found: 16.62% O; calc'd for $Ba_2RuCeO_6$, 15.68%; $Ba_2RuCeO_{6.5}$, 16.77%; $Ba_2Ru_{0.8}CeO_6$, 16.22%. The higher percent O may indicate that Ru is +6 or Ce is +4 and cation vacancies are present.

EXAMPLE 7

Preparation of $Ba_2TbRuO_6$

A well ground mixture of 2.7023 g of $BaO_2$ (2 mole parts), 1.4915 g of $Tb_4O_7$ (¼ mole part), and 0.8064 g of Ru (1 gram atom part) was treated as in Example 6. The product showed predominantly a distorted perovskite-type powder pattern. Oxygen analysis confirmed the formula: Found: 15.23%; calc'd for $Ba_2RuTbO_6$: 15.22%.

EXAMPLE 8

Preparation of $Ba_2BiRuO_6$

A well ground mixture of 3.387 g of $BaO_2$ (2 mole parts), 2.33 g of $Bi_2O_3$ (½ mole part), and 1.0107 g of Ru (1 gram atom part) was heated at 750° in air for 2 hr; then reground, and heated 3 days at 700°. The product showed predominantly a perovskite-type pattern, $a =$ 4.35 Å with traces of extraneous phases. Oxygen analysis confirmed the formula: Found: 14.43% O; calc'd for $Ba_2BiRuO_6$: 14.10% O.

EXAMPLE 9

Preparation of $Ba_2YRuO_6$

A well ground mixture of 3.064 g of $BaO_2$ (2 mole parts), 1.0215 g of $Y_2O_3$ (½ mole part), and 0.9144 g of Ru (1 gram atom part) was heated at 1000° for 24 hr; reground, and heated at 1250° for 24 hr.

The product showed a distorted perovskite-type pattern indexable with the hexagonal cell. The dimensions were refined to $a = 5.890 \pm 0.001$ Å; $c = 14.495 \pm 0.007$ Å. Oxygen analysis confirmed the formula: Found: 17.42% O; calc'd for $Ba_2YRuO_6$: 17.13% O. The powder pattern is shown in Table 3. Weak extraneous peaks were ignored.

Table 3

| Intensity | Powder Pattern of $Ba_2YRuO_6$ | | | | |
|---|---|---|---|---|---|
| | h | k | l | $d_{obs}$ | $d_{calc}$ |
| 2 | 1 | 0 | 1 | 4.815 | 4.812 |
| | 0 | 0 | 3 | | 4.832 |
| 1 | 1 | 0 | 2 | 4.171 | 4.171 |
| 6 | 1 | 0 | 3 | 3.509 | 3.508 |
| 100 | 1 | 1 | 0 | 2.947 | 2.945 |
| | 1 | 0 | 4 | | 2.954 |
| 3 | 1 | 0 | 5 | 2.521 | 2.520 |
| | 1 | 1 | 3 | | 2.515 |
| | 2 | 0 | 1 | | 2.512 |
| 4 | 2 | 0 | 2 | 2.407 | 2.406 |
| 5 | 2 | 0 | 3 | 2.254 | 2.556 |
| 24 | 2 | 0 | 4 | 2.085 | 2.086 |
| 4 | 2 | 0 | 5 | 1.915 | 1.915 |
| | 1 | 0 | 7 | | 1.918 |
| | 2 | 1 | 1 | | 1.911 |
| 1 | 2 | 1 | 2 | 1.863 | 1.863 |
| | 1 | 1 | 6 | | 1.868 |
| 2 | 2 | 1 | 3 | 1.790 | 1.791 |
| 23 | 3 | 0 | 0 | 1.700 | 1.700 |
| | 2 | 1 | 4 | | 1.702 |
| 3 | 2 | 1 | 5 | 1.605 | 1.605 |
| | 3 | 0 | 3 | | 1.604 |
| | 2 | 0 | 7 | | 1.607 |

EXAMPLE 10

Preparation of $Sr_2LaRuO_6$

A well ground mixture in the stoichiometric ratio $2SRCO_3$, ½ $La_2O_3$ and Ru was heated in air at 1000° for ½ hr, reground, and reheated at 1100° for 24 hr. The product showed a perovskite-type powder pattern which was more distorted than that shown in Example 2 and was not readily indexed.

EXAMPLE 11

Preparation of $Sr_2NdRuO_6$

A reaction similar to that in Example 10 was carried out except that $Nd_2O_3$ was used in place of $La_2O_3$. This produced a material which gave a distorted perovskite-type powder pattern similar to that in Example 10.

EXAMPLE 12

Preparation of $Sr_2HoRuO_6$ $Sr_2HoRuO_6$ was prepared by a reaction similar to that used in Example 10 except that $Ho_2O_3$ was used in place of $La_2O_3$. The powder pattern showed a distorted perovskite-type cell similar to that in Example 2.

EXAMPLE 13

Preparation of Sr$_2$YbRuO$_6$

A well ground mixture of 5.9712 g of SrCO$_3$ (2 mole parts), 3.9848 g of Yb$_2$O$_3$ (½ mole part), and 2.044 g of Ru (1 gram atom part) was treated as in Example 14. The product showed a distorted perovskite-type powder pattern. Oxygen analysis confirmed the formula: Found: 17.99% O; calc'd: 17.60%.

EXAMPLE 14

Preparation of Sr$_2$YRuO$_6$

A well ground mixture of 2.8992 g of SrCO$_3$ (2 mole parts), 1.1036 g of Y$_2$O$_3$ (½ mole part), and 0.9924 g of Ru (1 gram atom part) was heated in air at 1000° for 24 hr, reground, and heated at 1150° for 48 hr, reground, and heated at 1250° for 24 hr. The X-ray powder pattern showed a distorted perovskite-type cell. Oxygen analysis confirmed the formula: Found: 20.19% O; calc'd for Sr$_2$YbRuO$_6$: 20.81%.

EXAMPLE 15

Preparation of Ba$_2$LaRuO$_6$

A well ground mixture of 2.4528 g of BaCO$_3$ (2 mole parts), 1.7192 g of La$_2$(C$_2$O$_4$)$_3$ 4.21 H$_2$O (½ mole part) and 0.6181 g of ruthenium powder (1 gram atom part) were ground together and heated at 1100° for 1 hour, then reground, and reheated at 1100° for 24 hours. The X-ray powder pattern showed a perovskite-type powder pattern with a few extra peaks. Chemical analysis for O, found: 15.16%; calc'd: 15.72%. The product was reground and heated for 2 days at 1100°. The X-ray powder pattern showed a nearly single phase perovskite pattern. Chemical analysis, found: 15.73% O; calc'd: 15.72% O.

EXAMPLE 16

Preparation of Ba$_2$YbRuO$_6$

A well ground mixture of 2 mole parts of BaCO$_3$, ½ mole part of Yb$_2$O$_3$ and 1 gram atom part of Ru powder was heated as in Example 4. The product showed a distorted perovskite-type pattern. It was reground and heated at 1100° for 24–48 hours. The X-ray powder pattern showed a nearly single phase perovskite-type pattern with refined cell parameters, $a = 5.859 \pm 0.012$ Å, $c = 14.56 \pm 0.04$ Å. Chemical analysis for O, found: 14.14%; calc'd: 14.89%. The low value found may indicate nonstoichiometry due to the tendency for Yb to be divalent. O content calculated for Ba$_2$RuYb$^{+2}$O$_{5.5}$ = 13.82%. Thus, the composition may lie between the limits.

I claim:

1. The metal oxides which contain pentavalent ruthenium, exhibit perovskite-type crystal structure, and are of the formula $$Q_2MRuO_6$$

in which
  Q is barium or strontium, and
  M is yttrium, bismuth or rare earth metal of atomic number 57 to 70, provided that when Q is strontium, M is not bismuth.

2. The metal oxides of claim 1 of the formula $$Ba_2M'RuO_6$$

in which M' is yttrium, bismuth or rare earth metal of atomic number 57 to 70.

3. The metal oxide of claim 2 of the formula $$Ba_2LaRuO_6.$$

4. The metal oxide of claim 2 of the formula $$Ba_2EuRuO_6.$$

5. The metal oxides of claim 1 of the formula $$Sr_2M''RuO_6$$

in which M'' is yttrium or rare earth metal of atomic number 57 to 70.

* * * * *